United States Patent 3,378,580
Patented Apr. 16, 1968

3,378,580
2-ARYL-POLYHALO-BICYCLOHEPT-5-ENES
Carleton W. Roberts, Midland, and Daniel H. Haigh, Beaverton, Mich., assignors to The Dow Chemical Company, Midland, Mich., a corporation of Delaware
No Drawing. Continuation-in-part of application Ser. No. 240,136, Nov. 26, 1962. This application Mar. 18, 1965, Ser. No. 440,913
6 Claims. (Cl. 260—488)

This application is a continuation-in-part of our copending application Ser. No. 240,136, filed Nov. 26, 1962, now abandoned.

This invention relates to organic chemistry, and more particularly to compounds having the formula:

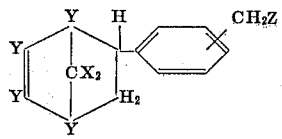

wherein X represents hydrogen or halogen of atomic weight less than 50, Y represents halogen of atomic weight of 25 to 100, namely chloro or bromo and Z represents halogen, hydroxy, or a lower alkanoyloxy radical derived from a monocarboxylic lower-alkanoic acid by removal of the active hydrogen from the carboxyl group. A monocarboxylic loweralkanoic acid as here understood contains a total of up to about four carbon atoms.

The present compounds are useful as herbicides, when applied to the foliage of plants that are to be killed. They are useful also as substrates in vapor-phase and gas chromatography columns for discrimination, by differential residence time, between components of a mixture. Added to flammable polymers they reduce flammability and, in sufficient amount, render the polymers self-extinguishing.

These new compounds may be prepared by the Diels-Alder diene synthesis. The reaction may be simply carried out by causing a reaction of a cyclopentadiene compound of the formula

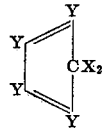

wherein X and Y have the values hereinbefore indicated, as the diene with, as dienophile, an ar-vinylbenzyl compound of the formula

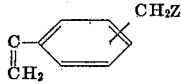

wherein Z has the values stated hereinbefore, to obtain the adduct product. The reactants are consumed in equimolecular amounts and may thus be supplied to the reaction. It is advantageous but not necessary to use an inert liquid reaction medium, such as xylene, hexane, heptane, octane, nonane, petroleum ether, benzene, toluene, cumene, ethylbenzene, diethylbenzene, ethyltoluene, chlorobenzene, orthodichlorobenzene, chlorotoluene, chloroethylbenzene, chloroxylene, and the like, of which the boiling serves to control the reaction temperature. The reaction may be carried out at any temperature from about 60° C. to about 200° C., but is preferably carried out at about 100° C. to 160° C. A reaction mixture of the reactants and reaction medium, if any, may be brought together in a reaction vessel whereupon the desired reaction takes place to some extent. When more rapid rate of reaction is desired, the reactants may be caused to react at a higher rate by heating the reaction mixture. The reaction usually goes to completion in from about one hour to about 60 hours, with formation of desired product and minor amounts of other substances. The product can be used in a completely crude form for many of its advantageous uses. When it is desired to recover the desired compound essentially pure, the product of reaction can be distilled at a subatmospheric pressure, such as about 100 millimeters mercury, absolute, to remove the liquid reaction medium and thereafter at a lower pressure such as about 0.2 mm., to obtain the essentially pure compound. Other methods of purification known to those skilled in the art, can be applied to the present compounds, for example, fractional crystallization.

Ar-vinylbenzyl compounds which are suitable starting materials include, for example, p-vinylbenzyl alcohol, m-vinylbenzyl chloride, p-vinylbenzyl iodide, o-vinylbenzyl fluoride, o-vinylbenzyl acetate, p-vinylbenzyl butyrate, and the like.

Suitable dienes include hexachlorocyclopentadiene, 1,2,3,4 - tetrachlorocyclopentadiene, 1,2,3,5 - tetrabromo-4,4 - difluorocyclopentadiene, hexabromocyclopentadiene, and the like.

The following examples will enable those skilled in the art to practice the present invention.

Example 1.—Preperation of 2-(ar-chloromethylphenyl) 1,4,5,6,7,7-hexachlorobicyclo[2.2.1]heptene-5

A mixture of 272 grams (1.0 mole) of hexachlorocyclopentadiene and 500 milliliters toluene is placed in a one liter, round-bottomed flask equipped with heating mantle, dropping funnel and reflux condenser, and heated to reflux temperatures, about 110–120° C. Thereto, during 45 minutes is added, dropwise, 152 grams (1 mole) ar-vinylbenzylchloride. The resulting mixture is heated under reflux for 30 hours to prepare the present product. The reaction mixture is then cooled and filtered to obtain a crude product as residue. The residue solid is recrystalized from heptane to obtain, in good yield, a white solid 2-(ar-chloromethylphenyl) 1,4,5,6,7,7-hexachlorobicyclo[2.2.1] heptene-5 product melting at 87–87.5° C. Infrared spectrum analysis confirms the assigned structure and establishes that the chloromethylphenyl group is about 80 percent para and 20 percent ortho. This is approximately their ratio of abundance in the starting vinylbenzyl chloride.

Example 2.—Preparation of 2-(p-chloromethylphenyl) 1,4,5,6,7,7-hexachlorobicyclo[2.2.1]heptene-5

Procedures essentially identical with the foregoing are repeated except that pure p-vinylbenzylchloride is used. The resulting pure product melts at 98–98.5° C. Elemental analysis gives values suitable for the compound and the assigned structure is confirmed by infrared spectrum analysis.

In procedures essentially identical with those of Example 1 other vinylbenzyl compounds are caused to react with a halocyclopentadiene of the stated structure, using any or several of various hydrocarbon and substituted hydrocarbon liquids as solvent.

p-Vinylbenzyl alcohol is caused to react with hexachlorocyclopentadiene in a natural solvent mixture of dichlorobenzenes resulting from the dichlorination of benzene, to prepare a 2-(α-hydroxy-p-tolyl)-1,4,5,6,7,7-hexachlorobicyclo-[2.2.1]-heptene-5 as a white crystalline solid.

In similar procedures but employing 5,5-dichloro-1,2,3,4 - tetrabromocyclopentadiene and p - vinylbenzyl butyrate there is obtained a 2-(α-butyryloxy - p - tolyl)-1,4,5,6-tetrabromo-7,7 - dichlorobicyclo[2.2.1]heptane - 5 as a white, crystalline solid. The assigned structure is confirmed by infrared analysis.

Employing a p-vinylbenzyl acetate and 1,2,3,4-tetrachloro-5,5-difluorocyclopentadiene, there is obtained a 2-(α-acetoxy-p-tolyl)-1,4,5,6-tetrachloro - 7,7 - difluorobicyclo-[2.2.1]-heptene-5 product as a white crystalline solid.

In similar procedures other products of the present invention are readily prepared.

Illustrative of utility in the present compounds, the compound 2-(ar-chloromethylphenyl)-1,4,5,6,7,7 - hexachlorobicyclo[2.2.1]heptene-5 is dispersed in water with the aid of essentially inert co-solvents and wetting agents to prepare an aqueous spray composition comprising the said compound at the rate of 3.3 pounds per hundred gallons of total composition. The application of this dispersion to wet thoroughly all surfaces of leaves and stems of strong young bean plants results in an almost complete kill of the plants.

When employing a compound of the present invention in chromatography, the compound is dissolved in a solvent and the resulting solution thoroughly mixed with a carrier which can be diatomaceous earth, and, thereupon, evaporated to dryness. This obtains a carrier essentially uniformly coated with substrate material and ready for packing, with suction and sonic vibration, into a chromatographic column. A column packed with the said carrier and substrate is useful in vapor phase and gas chromatography.

When employing a compound of the present invention for fire suppression in a polymer, the compound is incorporated into a polymer. In one manner, not usually preferred, the compound is combined with the monomer which is then polymerized. In another manner, the present compound and polymer are milled together as on opposed co-rotating rollers, one heated and one chilled, the deposited material removed by a doctor blade and returned to the nip of the rollers. Also, both can be dissolved together in a common solvent which is thereafter vaporized and removed. Amounts of the present compound sufficient to introduce halogen in the amount of 25 percent by weight of resulting mixture are self-extinguishing, with such polymers as polystyrene, ethylene, and the like.

The vinylbenzyl starting compounds herein are well known and are described in various references, for example British Patents 792,859 and 792,860.

The halogenated cyclopentadienes appear in, for example, U.S. Patents 2,459,783 and 3,007,958, and in the references therein cited.

We claim:

1. Compound of the formula

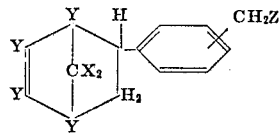

wherein X is selected from hydrogen and halogen of atomic weight less than 50 Y represents chloro or bromo, and Z represents a member of the group consisting of halogen, hydroxy, and loweralkanoyloxy radical derived from a monocarboxylic loweralkanoic acid by removal of the active hydrogen from the carboxyl group, wherein a monocarboxylic loweralkanoic acid as here understood contains a total of up to about four carbon atoms.

2. 2-(ar-chloromethylphenyl) - 1,4,5,6,7,7 - hexachlorobicycl-[2.2.1]-heptene-5.

3. 2-(p-chloromethylphenyl)-1,4,5,6,7,7 - hexachlorobicyclo[2.2.1]-heptene-5.

4. 2-(α-hydroxy-p - tolyl) - 1,4,5,6,7,7 - hexachlorobicyclo[2.2.1]-heptene-5.

5. 2-(α-butyryloxy-p-tolyl) - 1,4,5,6 - tetrabromo - 7,7-dichlorobicyclo-[2.2.1]-heptene-5.

6. 2(α-acetoxy-p-tolyl) - 1,4,5,6 - tetrachloro - 7,7 - difluorobicyclo-[2.2.1]-heptene-5.

References Cited

UNITED STATES PATENTS 2,841,485  7/1958  Johnson et al. _____ 260—618

LORRAINE A. WEINBERGER, *Primary Examiner.*

V. GARNER, *Assistant Examiner.*